(12) United States Patent
Jungreis

(10) Patent No.: US 6,541,940 B1
(45) Date of Patent: Apr. 1, 2003

(54) LOAD FOLLOWER USING BATTERIES EXHIBITING MEMORY

(75) Inventor: Aaron M. Jungreis, Cary, NC (US)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 10/025,049

(22) Filed: Dec. 19, 2001

(51) Int. Cl.$^7$ .............................................. H01M 10/46
(52) U.S. Cl. ...................................... 320/103; 320/119
(58) Field of Search ................................ 320/103, 116, 320/118, 119, 121, 123, 127, 128, 135, 137, 138

(56) References Cited

U.S. PATENT DOCUMENTS

| | | |
|---|---|---|
| 3,691,448 A | 9/1972 | Milward |
| 4,090,140 A | 5/1978 | Carter |
| 4,225,792 A | 9/1980 | Fahey |
| 4,345,197 A * | 8/1982 | Wheadon et al. |
| 4,441,872 A | 4/1984 | Seale |
| 4,631,898 A | 12/1986 | Brambilla |
| 4,829,225 A | 5/1989 | Podrazhansky et al. |
| 5,029,299 A | 7/1991 | Rodgers |
| 5,360,679 A | 11/1994 | Buswell et al. |
| 5,390,130 A | 2/1995 | Watanabe et al. |
| 5,409,784 A | 4/1995 | Bromberg et al. |
| 5,469,043 A | 11/1995 | Cherng et al. |
| 5,562,566 A | 10/1996 | Yang |
| 5,631,532 A | 5/1997 | Azuma et al. |
| 5,656,920 A | 8/1997 | Cherng et al. |
| 5,793,211 A | 8/1998 | Shimoyama |
| 6,127,815 A | 10/2000 | Wilcox |
| 6,184,593 B1 | 2/2001 | Jungreis |
| 6,194,794 B1 | 2/2001 | Lampe et al. |
| 6,238,076 B1 | 5/2001 | Pascale et al. |
| 6,239,579 B1 | 5/2001 | Dunn et al. |
| 6,242,873 B1 | 6/2001 | Drozdz et al. |
| 6,268,711 B1 * | 7/2001 | Bearfield |
| 6,304,006 B1 | 10/2001 | Jungreis |

* cited by examiner

Primary Examiner—Edward H. Tso
(74) Attorney, Agent, or Firm—Woodcock Washburn LLP

(57) ABSTRACT

Batteries are often used for load-following, particularly in combination with generation sources that cannot respond to fast load changes. Batteries that display "memory" (i.e., their ability to operate correctly over their entire depth of discharge depends on their previous level of charge or discharge) cannot adequately follow loads. This invention allows the use of batteries that display "memory" in load-following applications.

19 Claims, 2 Drawing Sheets

LOAD FOLLOWER USING BATTERIES EXHIBITING MEMORY

FIELD OF THE INVENTION

The present invention relates generally to the field of distributed power generation, and more particularly to an improved load follower configuration of a distributed power generation system.

BACKGROUND OF THE INVENTION

Distributed power generation concerns the movement of power generation devices from central, large scale power plants to smaller units located close to the end-users, thereby enabling significant environmental benefits to be derived from the use of sustainable energy sources. However, various forms of distributed generation are unable to adjust their output power fast enough to follow fast-changing loads. Fuel cells and microturbines are two such examples. Other types of distributed generators such as photovoltaic and wind-turbines produce fluctuating output power as a function of available energy (e.g.—sunlight or wind). Both slow-load-following generators and fluctuating-power generators are typically paired with some type of energy storage to operate as a stand-alone generation system.

The most common type of energy storage paired with distributed generators in stand-alone systems is a chemical battery—typically lead-acid battery. During operation of each type of system, the battery has to provide power for instantaneous load changes. For example, in a fuel cell system, the fuel source and the system operating temperature cannot be quickly adjusted. While these and other parameters are adjusted to match the required load, a battery either provides power to or absorbs power from the load, depending on whether the load is increasing or decreasing. In a stand-alone photovoltaic system, the photovoltaic arrays typically charge a bank of batteries and the batteries directly provide power to the load. In all of these systems, the rate of battery charge and discharge can vary considerably with time and is subject to the variability of the load. The batteries can therefore experience frequent cycling, and the level of discharge in that cycling can be shallow or deep, depending on the load and the availability of generator power.

FIG. 1 shows a typical power conversion system for a distributed generator system that includes a battery that is used for load-following. The system includes a generator 10, battery 12, and first and second power converters 14A and 14B (Power Converter1 and Power Converter2, respectively). The generator 10 provides power to the first power converter 14A. The output voltage of the generator may be dc, low-frequency ac, or high-frequency ac, depending on the output of the generator. The first power converter 14A is designed to convert the generator voltage to a relatively constant voltage on a dc link. This voltage may then be further processed if necessary to provide the correct voltage to the load. In some applications, for example, telecom power supplies, the dc link may be connected directly to the load.

The battery 12 is able to provide power to or draw power from the dc link through the second power converter 14B. In some cases, power converter 14B may be replaced by a direct connection of the battery to the dc link. In that case, adjusting the voltage of the dc link could control the charging and discharging of the battery 12. In other cases, the second power converter 14B can directly control the charge drawn from or the charge inserted into the battery.

When there is a sudden load increase, the second power converter 14B will draw power from the battery 12 equal to that increase until the generator 10 is able to respond. When the load is steady or decreasing, the generator can provide some additional power to charge the battery.

Most types of batteries exhibit shortened lifetimes when subjected to frequent cycling. Furthermore, some types of batteries exhibit a phenomenon often referred to as "memory". A battery that exhibits a "memory" phenomenon "remembers" its previous cycling history. For example, if a NiCad battery is only partially charged before being discharged, it cannot be fully charged again. This process worsens with partial charge cycles. A NiMH battery exhibits similar phenomenon—it will not provide full power at low charge levels if it was previously discharged only partially before recharging. The worsened performance in NiMH batteries is reversible whereas the worsened performance in NiCad batteries is not.

As a result of the "memory" effect, many types of batteries are not used in load-following applications. As a consequence, the most common type of battery for load-following is the lead-acid battery. However, lead-acid batteries have a number of shortcomings that make them undesirable for many load-following applications. Cycling them significantly shortens their service life. Furthermore, they contain lead and therefore offset one of the main benefits achieved by many forms of distributed generation—an environmentally safe solution to generation. Lead-acid batteries also have a relatively inefficient round-trip efficiency. Just keeping them charged can take a significant amount of energy. Since distributed generation is relatively expensive on a cost per kilowatt basis, a high efficiency load-following scheme is crucial to make the overall system cost-effective.

SUMMARY OF THE INVENTION

The present invention permits the use of batteries that exhibit a "memory" effect in load-following applications. The preferred embodiments use two batteries. At any given time, one battery is only discharged while the other battery is only charged. When one battery reaches full charge and the other reaches full discharge, the role of the two batteries is reversed. In this way, the memory effect does not reduce the performance of the batteries. Other aspects of the present invention are described below.

DETAILED DESCRIPTION OF PREFERRED EMBODIMENTS

First Embodiment

Figure 2:
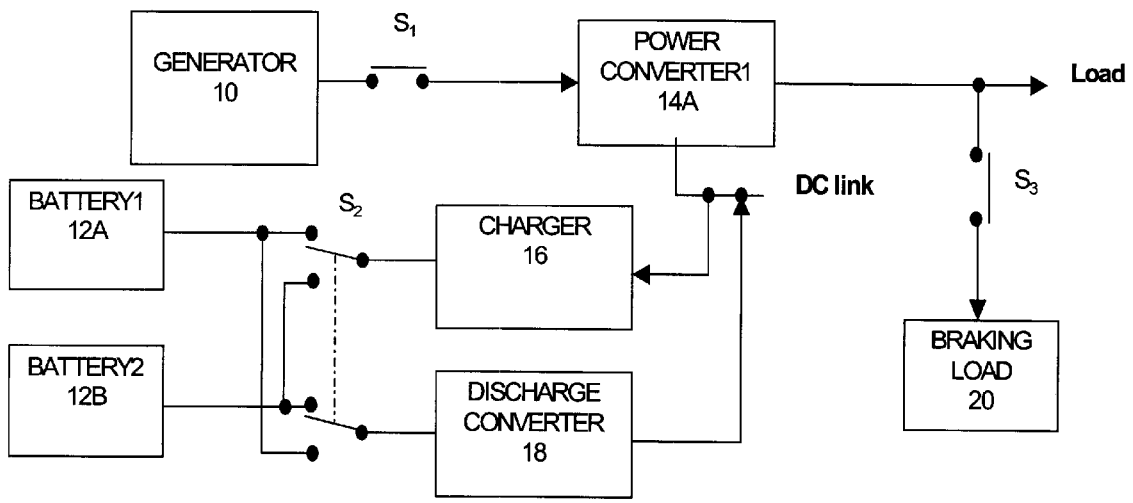
FIG. 2 schematically depicts a preferred embodiment of a load-follower configuration of a power generation system in accordance with the present invention.

FIG. 2 depicts a first presently preferred embodiment of the invention. The generator 10 can produce either ac or dc voltage. The power converter 14A transforms the voltage from the generator to dc voltage at the dc link, and also transforms the voltage from the dc link to the desired output voltage at the load. A charger 16 and discharge controller/ converter 18 are also connected to the dc link. While switch S2 is in the UP position, the charger 16 charges a first battery (Battery1) 12A until it is fully charged while the discharge converter 18 draws power from a second battery (Battery2) 12B to provide power to the dc link as needed to make up the shortfall in available power from the generator 10. While switch S2 is in the DOWN position, the roles of batteries 12A and 12B are reversed. Some types of generators (e.g.— some microturbines) might also require a braking load 20 connected to the output through a switch S3, as shown. It is possible to connect the braking load to the DC link rather than to the output. When a negative load step occurs, some generators (such as fuel cells) can reduce their output almost instantaneously, whereas other generators (such as microturbines) cannot immediately reduce their output. Generators that cannot immediately reduce their output can then put some of the extra energy into the battery being charged, and some of it into the braking load. If the battery being charged has become fully charged before the battery being discharged has become fully discharged, then all of the extra energy coming from a negative load step would be transferred to the braking load.

Switch S3 may be either a mechanical or a semiconductor switch. When switch S3 is a semiconductor switch, it can be pulse-width-modulated to control the amount of energy going into the braking load. If switch S3 is a mechanical switch, then the amount of braking energy cannot be controlled. Effective power control during braking would then be obtained by closing switch S3 and then controllably discharging the battery that is currently in discharge mode. Switch S3 can also be replaced with a power converter that can be used to control the braking energy. The most preferably embodiment is to connect a braking resistor in series with a semiconductor switch across the dc link. Braking energy could then be controlled by pulse-width-modulating the semiconductor switch.

The system of FIG. 2 may be delivered with battery 12B mostly (or completely) charged and with battery 12A completely discharged. Operation begins with switch S2 in the UP position. After the generator 10 is started, the generator provides power to the load and also some charging power to battery 12A through the charger. When a positive load step change occurs, battery 12B provides the shortfall in power until the generator is able to produce enough power to support the load. It is also possible to reduce the rate of charging to battery 12A to provide some of the shortfall in power (the decision of whether or not to do this will depend on the expected level of load step changes and the type of generator).

The batteries are preferably sized such that battery 12A will be completely charged before battery 12B is discharged. Sizing of the batteries to fulfill these conditions is no different from sizing of the batteries in prior art implementations of load-following. The size of the batteries will depend on the size of the maximum load step, the amount of time required for the generator to respond to a step-load change, and the expected frequency and magnitude of load changes.

When battery 12B is completely discharged, switch S2 is repositioned to the down position and the cycle repeats, this time with battery 12B charging and battery 12A discharging. When battery 12A is completely discharged, switch S2 is moved back to the UP position and the cycle repeats.

Since battery 12A and battery 12B are preferably run down to complete discharge before recharging them, the memory effect will not be present, or will be minimal. It is therefore possible to use batteries that normally exhibit a memory effect.

Second Embodiment

Figure 3:
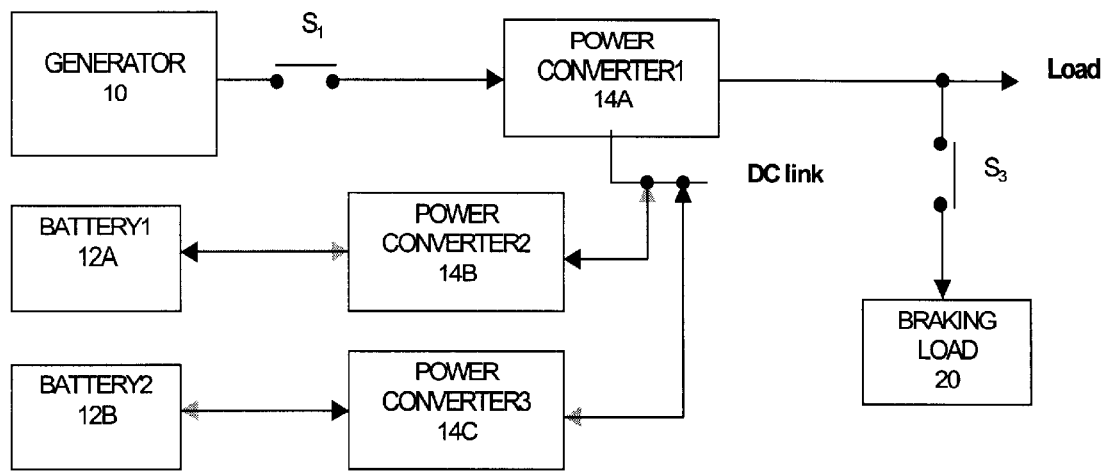
FIG. 3 schematically depicts another preferred embodiment of a load-follower configuration of a power generation system in accordance with the present invention.

Another preferred embodiment of the present invention is shown in FIG. 3. In this embodiment, a second power converter 14B and a third power converter 14C can each function as either a charger or a discharge controller. Operation of the circuit is similar to that of the circuit shown in FIG. 2 except that the function of switch S2 is replaced by changing the direction of power flow in power converter 14B and power converter 14C. For example, in the initial state, battery 12A is completely discharged and battery 12B is fully or mostly charged. Power is drawn from the dc link through power converter 14B to charge battery 12A. When there is a shortfall in available power from the generator 10, power converter 14C draws power from battery 12B and sends it to the dc link to make up for the shortfall in power. When battery 12B is completely discharged, then power converter 14C will begin to charge battery 12B while power converter 14B draws power from battery 12A as needed to provide for shortfalls in generator power. Power converters 14A and 14B may share components such as output filter capacitor, internal house-keeping power supplies, and digital signal processors. It is also possible to operate power converters such that their PWM signals are 180 degrees out of phase. That will reduce the ripple current in the shared output filter capacitor and might allow a reduction in size of that capacitor.

Conclusion

Figure 1:
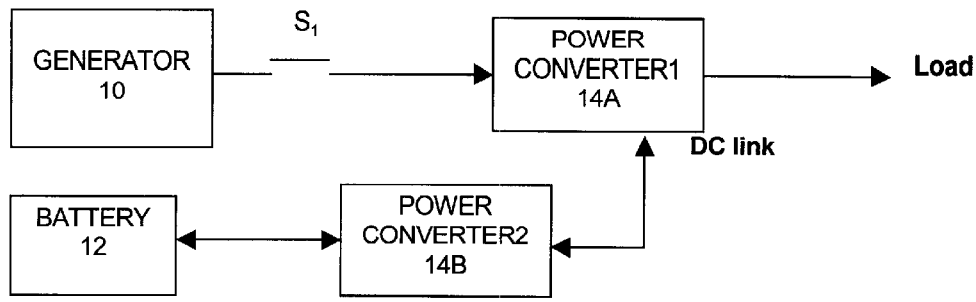
FIG. 1 schematically depicts a previously known load-follower configuration of a power generation system.

The presently preferred embodiments described above operate load-following batteries in such a way that the battery is discharged completely before being recharged. This allows the use of batteries that display a "memory" effect in load-following applications. It may be noted that these embodiments require twice as much energy storage for load-following as the single-battery prior art system depicted in FIG. 1. However, many distributed generation systems require a significant amount of stored energy at startup. The startup energy may be more than twice the energy required for load following. In these applications, it is also possible to deliver systems with both batteries fully charged. At least one battery will be completely discharged during startup, so the system can operate normally after startup. Furthermore, the generator can be programmed to remain on long enough to fully charge both batteries before shutting down, thus assuring enough stored energy for startup. Such a system would contain the same amount of energy storage as prior art systems.

Persons skilled in the art of power generation will appreciate that the components described herein as making up the preferred embodiments of the present invention are well known and may be implemented in many different forms. Thus, the present invention is by no means limited to any particular form of generator 10, battery 12, power converter 14, charger 16, discharge converter 18 or braking load 20. Moreover, it is apparent that the present invention may be practiced without necessarily using all of these components, or by replacing some or all of these with functional equivalents. For example, if generator 10 is a dc generator, then in some cases, power converter1. 14A might not be required. Accordingly, the scope of protection of the following claims is not intended to be limited to the presently preferred embodiments described herein.

I claim:

1. A power generation system, comprising:
   (a) a generator;
   (b) first and second batteries; and
   (c) means for coupling the generator and batteries to a load in a load-follower configuration wherein changes in power requirements of the load are compensated by the batteries, and wherein the first battery is charged by the generator while the second battery is being discharged to the load, and vice versa.

2. A power generation system as recited in claim 1, wherein the generator is a microturbine generator.

3. A power generation system as recited in claim 1, wherein the generator is a photovoltaic generator.

4. A power generation system as recited in claim 1, wherein the generator is a wind-turbine generator.

5. A power generation system as recited in claim 1, wherein the generator is a fuel cell.

6. A power generation system as recited in claim 1, wherein the first and second batteries exhibit memory.

7. A power generation system as recited in claim 1, wherein the first and second batteries are chemical batteries.

8. A power generation system as recited in claim 1, wherein the first and second batteries are lead-acid batteries.

9. A power generation system as recited in claim 1, wherein the first and second batteries are NiCad batteries.

10. A power generation system as recited in claim 1, wherein the first and second batteries are NiMH batteries.

11. A power generation system as recited in claim 1, further comprising a braking load operatively coupled to the means for coupling.

12. A power generation system as recited in claim 1, wherein the means for coupling comprises a first power converter operatively coupled between the generator and the load.

13. A power generation system as recited in claim 12, wherein the means for coupling further comprises a charger and a discharge converter each of which are operatively coupled between the first power converter and the first and second batteries.

14. A power generation system as recited in claim 13, wherein the means for coupling further comprises a switch (S2) operatively coupled between the batteries and the charger and discharge converter.

15. A power generation system as recited in claim 12, wherein the means for coupling further comprises a second and a third power converter each of which are operatively coupled between the first power converter and the first and second batteries.

16. A power generation system, comprising:
   (a) a generator;
   (b) first and second batteries each of which exhibits memory;
   (c) a first power converter operatively coupled between the generator and a load; and
   (d) means for coupling the batteries to the power converter such that changes in power requirements of the load are compensated by the batteries, and such that the first battery is charged by the generator while the second battery is being discharged to the load, and vice versa.

17. A power generation system as recited in claim 16, wherein the means for coupling further comprises a charger and a discharge converter each of which are operatively coupled between the first power converter and the first and second batteries.

18. A power generation system as recited in claim 17, wherein the means for coupling further comprises a switch (S2) operatively coupled between the batteries and the charger and discharge converter.

19. A power generation system as recited in claim 17, wherein the means for coupling further comprises a second and a third power converter each of which are operatively coupled between the first power converter and the first and second batteries.

* * * * *